DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JUNE 5, 1973

911 O.G. 9

T911,011
DE-INKABLE NEWS INK COMPOSITIONS
Michael Pugliese, Passaic, N.J., assignor to J. M. Huber Corporation, Locust, N.J.
Filed Oct. 20, 1972, Ser. No. 299,543
Int. Cl. C09d *11/00*
U.S. Cl. 106—32
No Drawing. 12 Pages Specification

A news ink composition for use in printing newspaper, containing a water soluble, nonionic, dispersing and emulsifying agent to improve the brightness of the de-inked newsprint. The ink composition comprises carbon black, mineral ink oil and small quantities of a dispersing agent which physically or chemically attach to the ink ingredients. In the de-inking process the dispersing agent emulsifies the dark materials of the ink and frees them in a colloidal state from the web of the recovered pulp.